(12) United States Patent
Lorenzo et al.

(10) Patent No.: US 7,984,941 B2
(45) Date of Patent: Jul. 26, 2011

(54) RAPID DEPLOYMENT MODULE CARRIER

(76) Inventors: Montana Trey Lorenzo, Prewitt, NM (US); Henry Tyrell Lorezno, Prewitt, NM (US)

( * ) Notice: Subject to any disclaimer, the term of this patent is extended or adjusted under 35 U.S.C. 154(b) by 0 days.

(21) Appl. No.: 12/433,001

(22) Filed: Apr. 30, 2009

(65) Prior Publication Data
US 2010/0276970 A1    Nov. 4, 2010

(51) Int. Cl.
*B60P 1/64* (2006.01)
(52) U.S. Cl. .......................... 296/35.3; 410/73
(58) Field of Classification Search ............... 296/35.1, 296/35.3; 410/52, 73, 77; 280/DIG. 8
See application file for complete search history.

(56) References Cited

U.S. PATENT DOCUMENTS

| | | | |
|---|---|---|---|
| 4,352,517 A * | 10/1982 | Bertolini | 296/35.3 |
| 4,737,055 A | 4/1988 | Scully | |
| 5,490,753 A | 2/1996 | Green | |
| 5,829,946 A | 11/1998 | McNeilus et al. | |
| 6,077,024 A | 6/2000 | Trueblood | |
| 6,499,783 B1 * | 12/2002 | Husted | 296/24.31 |
| 6,910,844 B2 | 6/2005 | Trescott | |
| 7,354,231 B2 | 4/2008 | German | |
| 7,441,809 B1 | 10/2008 | Coombs et al. | |
| 7,722,110 B2 | 5/2010 | McCarthy | |
| 2008/0017426 A1 | 1/2008 | Walters et al. | |
| 2008/0284118 A1 | 11/2008 | Walters et al. | |
| 2009/0000849 A1 | 1/2009 | Leonard et al. | |
| 2009/0095866 A1 * | 4/2009 | Brescia | 248/313 |
| 2010/0123334 A1 | 5/2010 | Ische | |

* cited by examiner

*Primary Examiner* — Joseph D Pape
(74) *Attorney, Agent, or Firm* — Dennis F. Armijo

(57) ABSTRACT

A Rapid Deployment Modular Carrier (RDMC) that incorporates a unique locking system and auxiliary control systems for the loading, transportation, and unloading of Rapid Deployment Modules (RDM's). The locking system has a hinging powered arm, linear driven pin, and rotating locking clip. The auxiliary systems has an electronic control panel that manages the engagement and disengagement of the locking system. The control panel also manages the suspension components of the RDMC, adjusting ride height and handling characteristics as needed.

8 Claims, 9 Drawing Sheets

RAPID DEPLOYMENT MODULE CARRIER

BACKGROUND OF THE INVENTION

1. Field of the Invention (Technical Field)

The presently claimed invention relates to motor vehicles and more particularly to vehicles with interchangeable modular payloads specifically designed for emergency response and military applications.

2. Background Art

When an emergency response agency wants to expand capabilities it normally needs to invest large amounts of their budget to acquire specialized equipment, such as vehicles to provide a specific type of service. To avoid this costly alternative, vehicles with removable payloads are being used. This provides a single vehicle with varying types of modular payloads for particular uses. There are several prior art modular vehicles. Some of these include US Patent Application Pub. No. US 2008/0017426 A1 which describes a modular vehicle system for configuring the core of the vehicle as desired by exchanging modules. Another prior art device is described in U.S. Pat. No. 5,829,946 which describes a system for exchanging a chassis mounted truck body or modular container for refuse trucks. These prior art systems are very rudimentary in positioning and locking the modular payload system on the vehicle. With our vehicle being a high dollar piece of equipment, it can be limited to a single purchase and funds can be directed to expanding the RDM variants that are much more affordable. All this combined makes a versatile and economical piece of equipment The problem itself starts with the lack of availability of versatile designs on the market. The majority of designs used today are very expensive and are usually sole purpose vehicles. The function being performed today is in the form of military vehicles but only the modular aspect of the design. Previous designs have been geared towards modularity in military vehicles. The systems are specifically for the vehicles weapon system and operator compartment and allows the primary weapon of the vehicle to be converted as well as operator cabin seating configuration. These designs convert the entire vehicle including the body, cabin and the operating systems.

Previous designs are very specific requiring lengthy training for the operation of the vehicle. The area that seems most problematic is the complexity of the conversion process. This process requires a specialized garage for conversion as well as heavy equipment to lift the conversion modules. This entire process is time consuming by a crew of trained operators and eliminates the possibility of conversion in the field by the vehicle operators themselves. The first problem these designs encounter is that they are very expensive both to the consumer and for production, limiting the availability to emergency response agencies. The second problem these designs fail to solve is the ability to stock multiple conversion modules due to the complexity of the designs, meaning the modules would be at headquarters awaiting conversion instead of the mobilization area where they are needed during actual operations

SUMMARY OF THE INVENTION

Disclosure of the Invention

The rapid deployment module carrier (RDMC) is a vehicle platform and system designed to deploy rapid deployment modules to limited access off road areas in an efficient and swift manner. The RDMC has a tube frame off road vehicle platform with integrated pneumatic suspension components designed specifically for the loading and deploying of the Rapid Deployment Module (RDM) without the use of external equipment or tools. The vehicle incorporates a rear frame platform for the mounting of the RDM via pneumatic lock and pin system. RDM's are modular pod variants that quickly mount and become integrated on the RDMC vehicle system. RDM variants include mission specific modules also the ability to retrofit any existing equipment to the RDM platform including, but not limited to, emergency medical equipment, disaster response operations, mass casualty emergencies and homeland security operations.

The objective of the RDMC vehicle is to provide users with a "one size fits all" solution to emergency responders. This provides the resource to make emergency response by agencies more efficient as well as reducing calls to deployment delays due to multiple response agencies and isolated capabilities. Additionally, the RDMC is a cost efficient option for agencies with lower Insurance Services Office (ISO) ratings and budgets to expand specialized response capabilities. This is achieved by limiting large purchase expenses to one RDMC vehicle while still allowing the agency to expand capabilities with the RDM variants at a much lower cost than a separate specialized vehicle.

The claimed invention requires no tools or outside equipment for conversion and can be converted by only one person with minimal training. Further, due to the versatility of the RDMC, it can reach a broad target market without altering the basic design of the vehicle.

Other objects, advantages, and novel features, and further scope of applicability of the presently claimed invention will be set forth in part in the detailed description to follow, taken in conjunction with the accompanying drawings, and in part will become apparent to those skilled in the art upon examination of the following, or may be learned by practice of the claimed invention. The objects and advantages of the claimed invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying Out the Invention

There are several modular vehicles presently in the market; however to mount and demount large pieces of equipment and deploying them quickly and efficiently to a response area is often lost among today's designs. The Rapid Deployment Module Carrier (RDMC) overcomes the deficiencies in the prior art systems. Another unique feature of the RDMC is that the design is based around an automatic/manual principal for all critical components. This feature reduces the chance of system control failure due to the simplicity of the design. Additionally, the present design is very simple to use so that training and operation objectives are achieved by any operator using the least amount of time possible, and is not dependent on the mechanical background or experience of the operator.

The RDMC is particularly useful as a modular emergency response vehicle. The design is appealing to EMS and fire departments as well as various government agencies, specifically special operations and mobile support units. With the mobility and modularity, key points of the vehicle are devoted to remote support operations such as deployed communication relay units and remote power generation units. Another unique feature of the unit is the ability to house all resource units for homeland security operations. The vehicle can also incorporate key units for disaster response and border patrol operations. The utility of the vehicle is extremely broad considering that the vehicle is designed to integrate any qualifying equipment to be converted to an RDM status.

Figure 1:
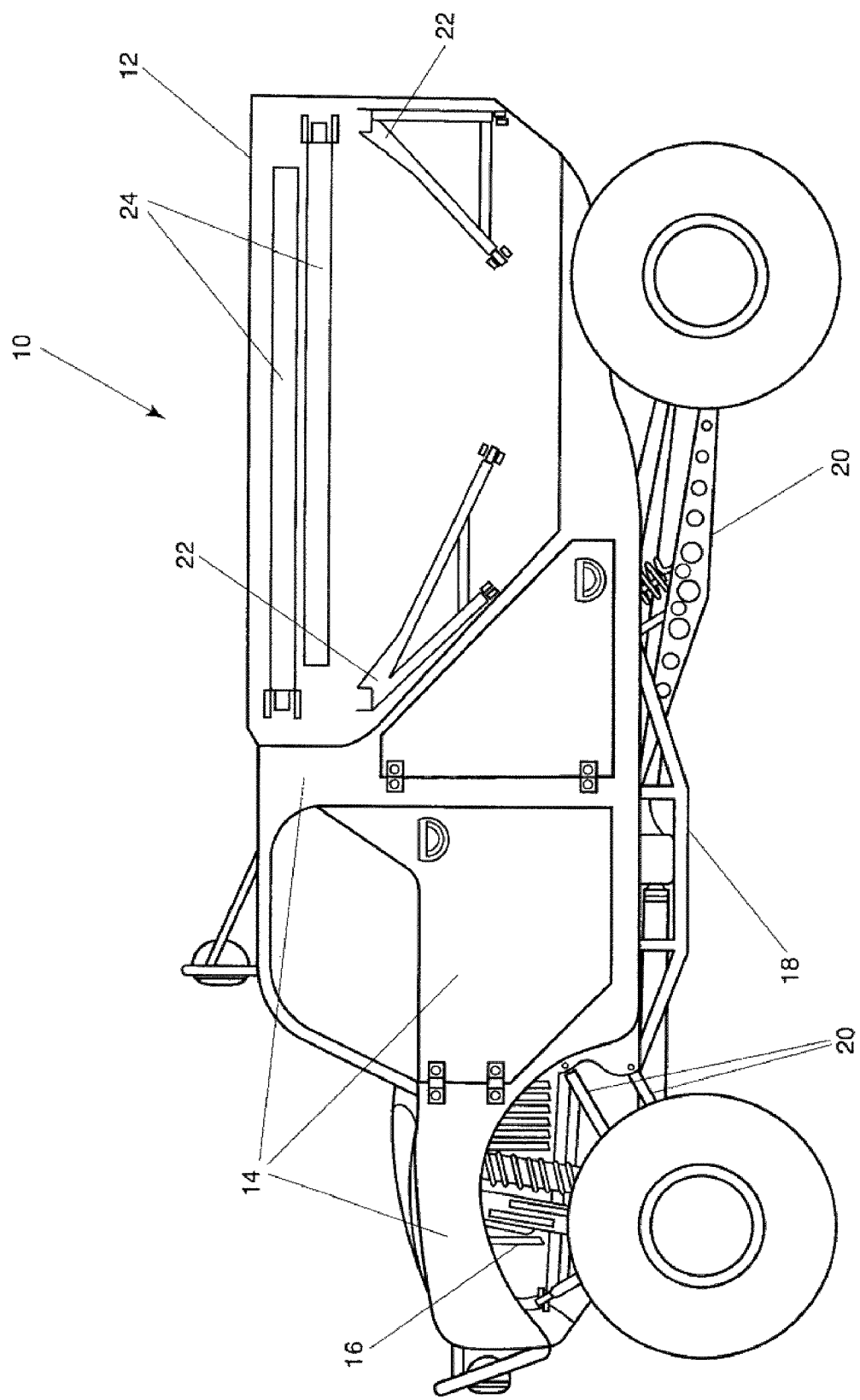
FIG. 1 is a side view of a RDM affixed to an RDMC.

First, a brief overview of the operative components is provided. FIG. 1 is a side view of the RDMC 10 with an affixed Rapid Deployment Module (RDM) 12 or payload. As shown, RDMC 10 can be equipped with modular body panels 14 that allow for rapid integration of differing types of armor depending on weight and threat requirements. Modular mounts 16 can be provided to accommodate differing engine types. The chassis is preferably a tube type chassis 18 made from chromium molybdenum alloy. This configuration maintains a low weight and high strength platform. A long travel suspension 20 can be integrated with pneumatic assisted components to high speed stability for all types of terrain and also provides clearance for RDM 12 loading and unloading.

Figure 2:
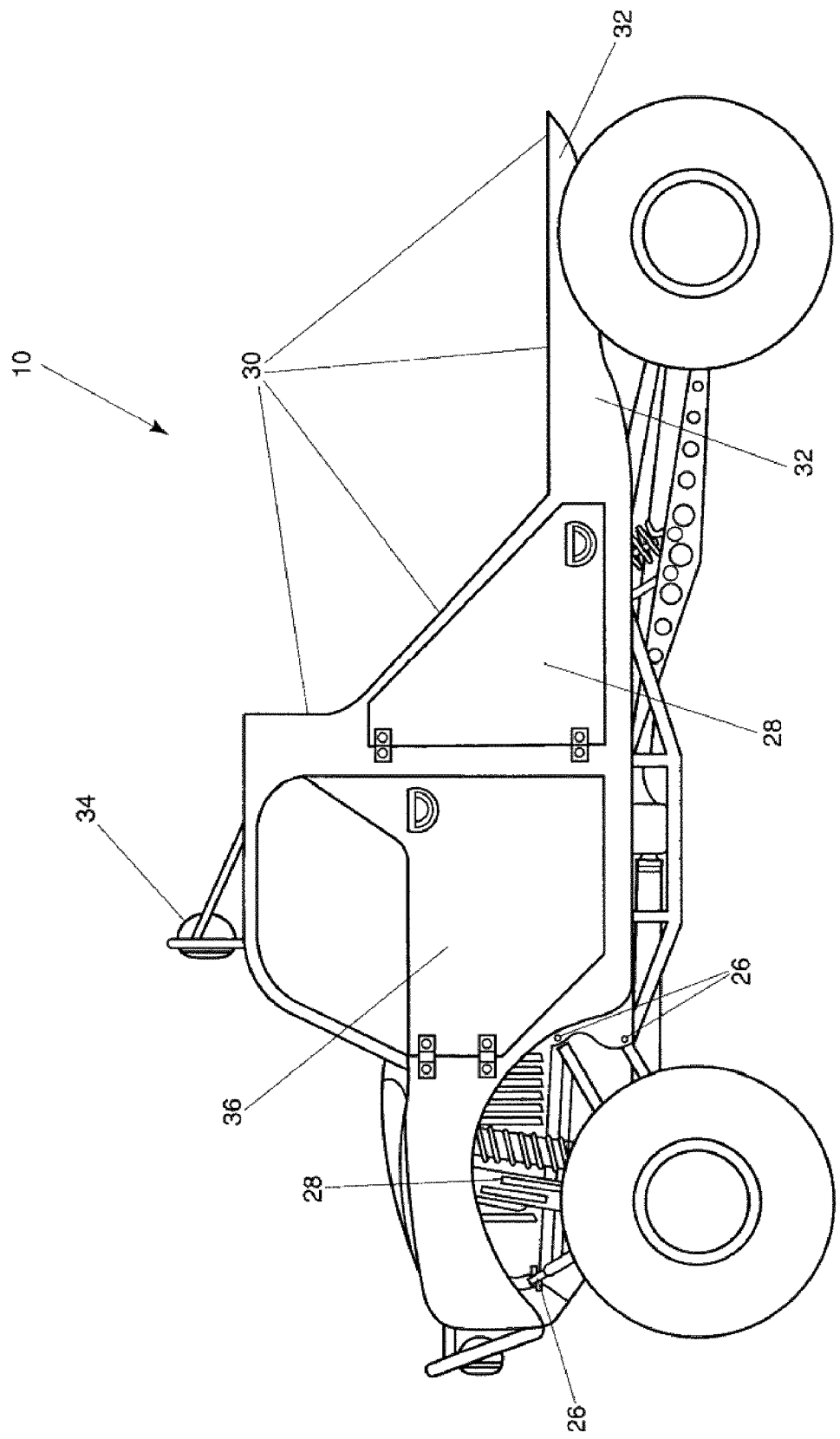
FIG. 2 is a side view of the RDMC without a RDM.

FIG. 2 is a side view of the RDMC 10 without an RDM. High intensity discharge (HID) lighting 34 reduces the load on the alternator, which results in additional power for other operating systems. Pneumatic ride height and RDM locking controls 24 are preferably located inside the vehicle which allows the operator to make adjustments without exiting the vehicle. Heim joints and delrin bushings 26 maintain close tolerances, extends service life, and are easily maintained and/or replaced. Pneumatic suspension assist components 28 are preferably located in the front and rear compartment of RDMC 10. Primary pneumatic actuated RDM to platform locking system 30 can be located on the vehicle bed as shown, or in any other location on the vehicle. Secondary locking system 32 ensures the RDM is locked to RDMC platform in the event of a failure primary locking system 30.

The innovative feature of the disclosed design is the ability to adapt and convert between variants in short periods of time. To achieve this, the design incorporates simplicity and reliability reducing the number of systems and components that could fail. The modular system is a plug and play system eliminating the need for specialized training required for conversion of the unit. All locking systems are pneumatically operated and have self aligning mounting points. During the mounting process the RDM connects to a universal outlet plug equipped on the RDMC. This allows the main operating systems to be on the RDMC and saves space for the backup systems that are used while the RDM is deployed in the field.

Figure 3:
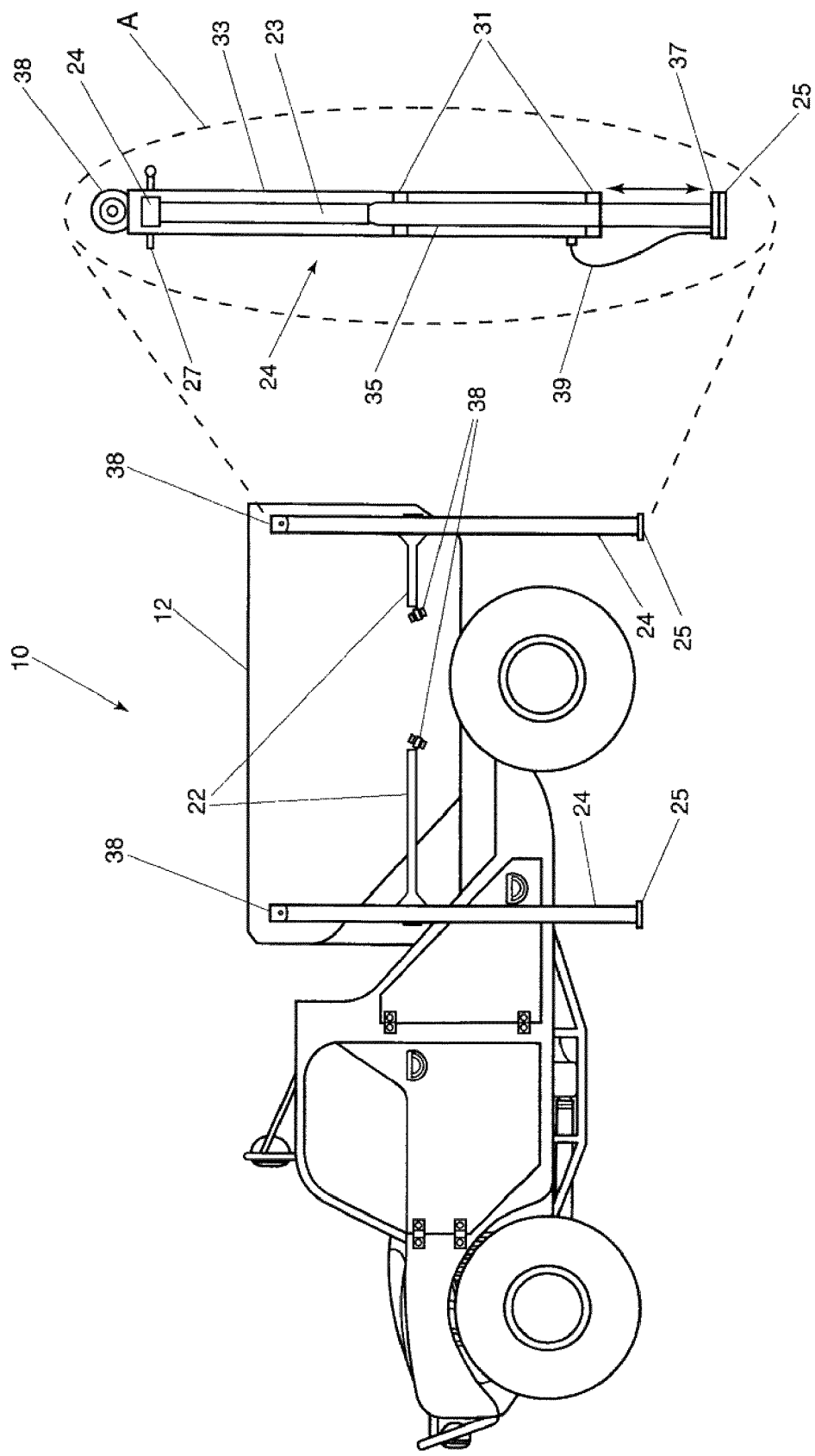
FIG. 3 depicts a typical demount procedure.

Again referring to FIG. 1, RDMC 10 is in neutral position ready for transport. RDM 12 is engaged and operational for deployment. RDM can be powered by onboard support systems or has the option of self sustaining operating systems. The RDMC suspension system adapts for variations in payload and RDM weight. FIG. 3 depicts a typical demount procedure. RDM support legs 24 are released via pin lock or the like and lowered into position and locked into place via support guides 22. RDM support legs 24 and support guides 22 are preferably hinged with a rotating hinge 38 to allow for rotational movement and support. Each RDM support leg 24 can have a metal tube body with an internal metal tube of smaller diameter allowing the inner tube to slide in and out telescopically when adjusting length. Referring to FIG. 3, exploded view A shows the exemplary RDM support legs 24 and their operational features. As shown, rotating hinge 38 can be a uniball spherical bearing, or the like to provide rotational movement and the ability to support the weight of RDM 12. RDM support legs have an outer tube 33 and a telescopic inner tube 35. RDM support legs 24 also preferably have an internal manual, pneumatic or electronic driven ram 23 that will allow linear adjustment of each RDM leg 24 via telescopic inner tube 35. Ram 23 is affixed to leg 24 via push pin 27 through billet block 29, as shown. Bushings 31 provide stability for telescopic inner tube 35. Pressure sensor 25 is affixed to bottom plate 37, with wiring harness 39 to wire sensors to control panel 36, as shown. Pressure sensor 25 can be a pressure sensitive pad or a proximity sensor. The preferred configuration will have 4 RDM legs, one on each corner or two on each side. Once RDM support legs 24 are properly positioned and proximity sensors 25 confirm contact via a lowering action provided by ram 23, the locking mechanism, described more fully below, is disengaged. RDMC 10 is lowered via pneumatic suspension components 28, and is driven away from the supported RDM 12, leaving RDM 12 on support legs 24 for rapid pickup and transport or lowered to ground level for extended operation periods. Optionally, RDM 12 can be fully operational without RDMC 10 support systems. RDMC 10 is cleared and ready for additional RDM deployment. Pneumatic suspension components 28 are then adjusted due to the removal of RDM 12 and the original shock spring rate is returned to normal.

Figure 4:
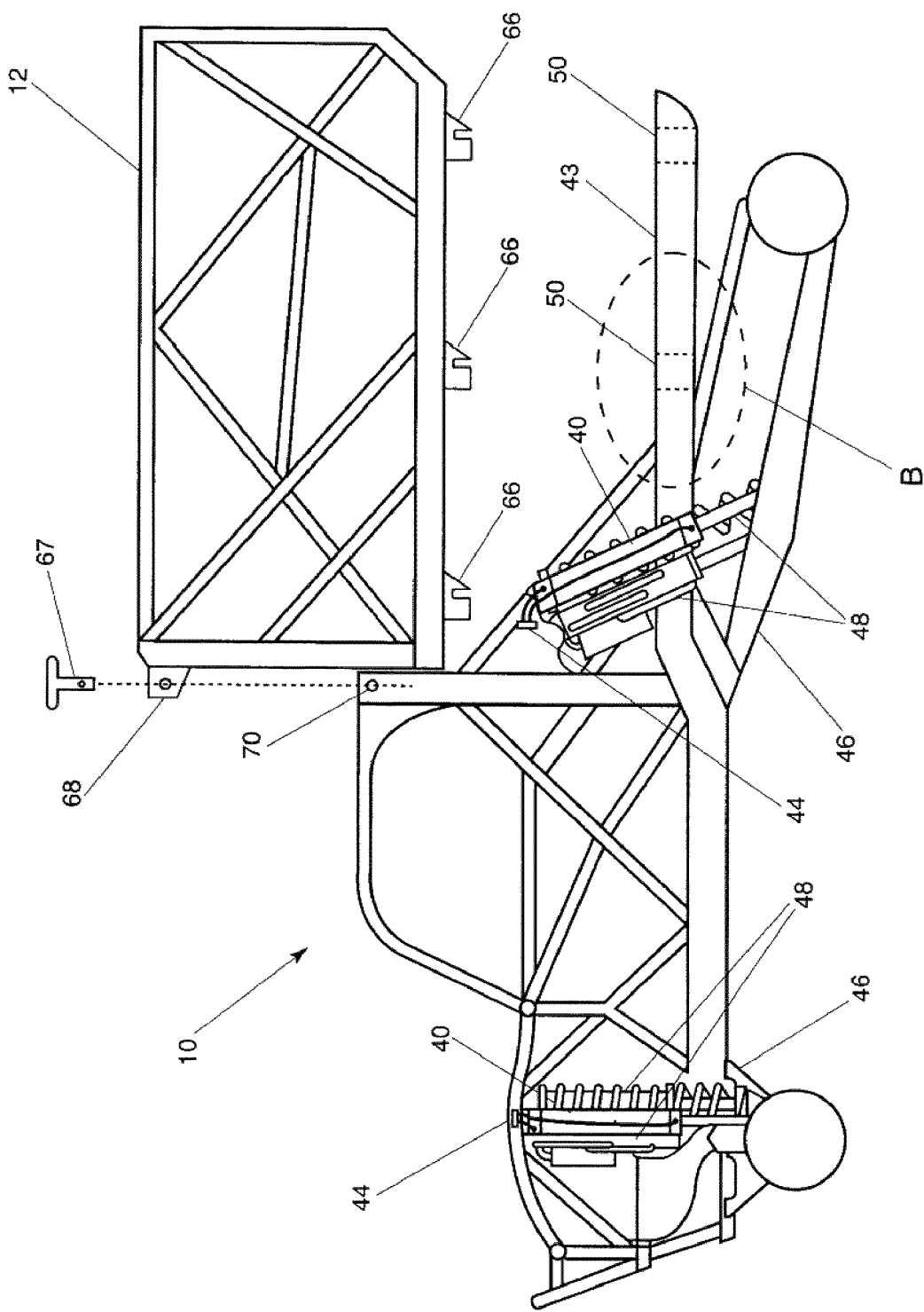
FIG. 4 shows the preferred pneumatic suspension components.

The preferred pneumatic suspension components 28 are shown in FIG. 4. These components work in unison to lower and lift RDMC 10 for mounting, demounting and positioning a RDM 12. Double acting pneumatic cylinders 40 are used primarily for the raising of RDM mounting platform 42 during engagement and lowering of RDM platform 42 during disengagement. The preferred double acting cylinders are E type pneumatic cylinders affixed to RDM suspension 20. Cylinder pressure and length is controlled by input from RDM position sensors during engagement and disengagement processes, as described below. Cylinder control valves 44 can be linked to a control system 36 to activate and deactivate electric solenoids to provide, monitor and release pressure at predetermined pressures (not shown). The preferred cylinder control valves 44 and automated valves that alternate between compression strokes and extension strokes depending on the process currently in use and during transportation will allow cylinder pressure and length retention. Long travel suspension components 46 allow for a wide range of motion for RDM engagement. Front suspension can have a standard A-arm or A-arm/J-arm, which allows for a full 24 inches of control while the rear is a four link live axle system allowing a full 36 inches for RDM engagement. Modified coilover shock absorbers and triple bypass shocks 48, front and rear, control the RDM engagement system during transport.

Another unique aspect of the claimed invention is the locking mechanism. The locking mechanism has a three lock system. Referring to FIG. 4, locking apparatuses 50 are used to secure RDM 12. RDM 12 is lowered into position by lowering RDM locking receivers 66 into locking apparatuses 50 which are located inside of frame 43. Six locking apparatuses 50 are optimally used, with RDM locking receivers 66 to compliment each other. Although, this example uses six locking apparatuses, the number can be varied depending on the configuration and weight of RDM 12. The six locking apparatuses are distributed with three locks on one side and three on the other side. In addition, one or more top locks can be used with RDM top lock aperture 68 and RDMC top lock aperture 70, with one lock on one side and one on the other side. These top locks can be manually locked with a "T" shaped push pin 67 inserted to further secure RDM 12 to RDMC 10.

Figure 5:
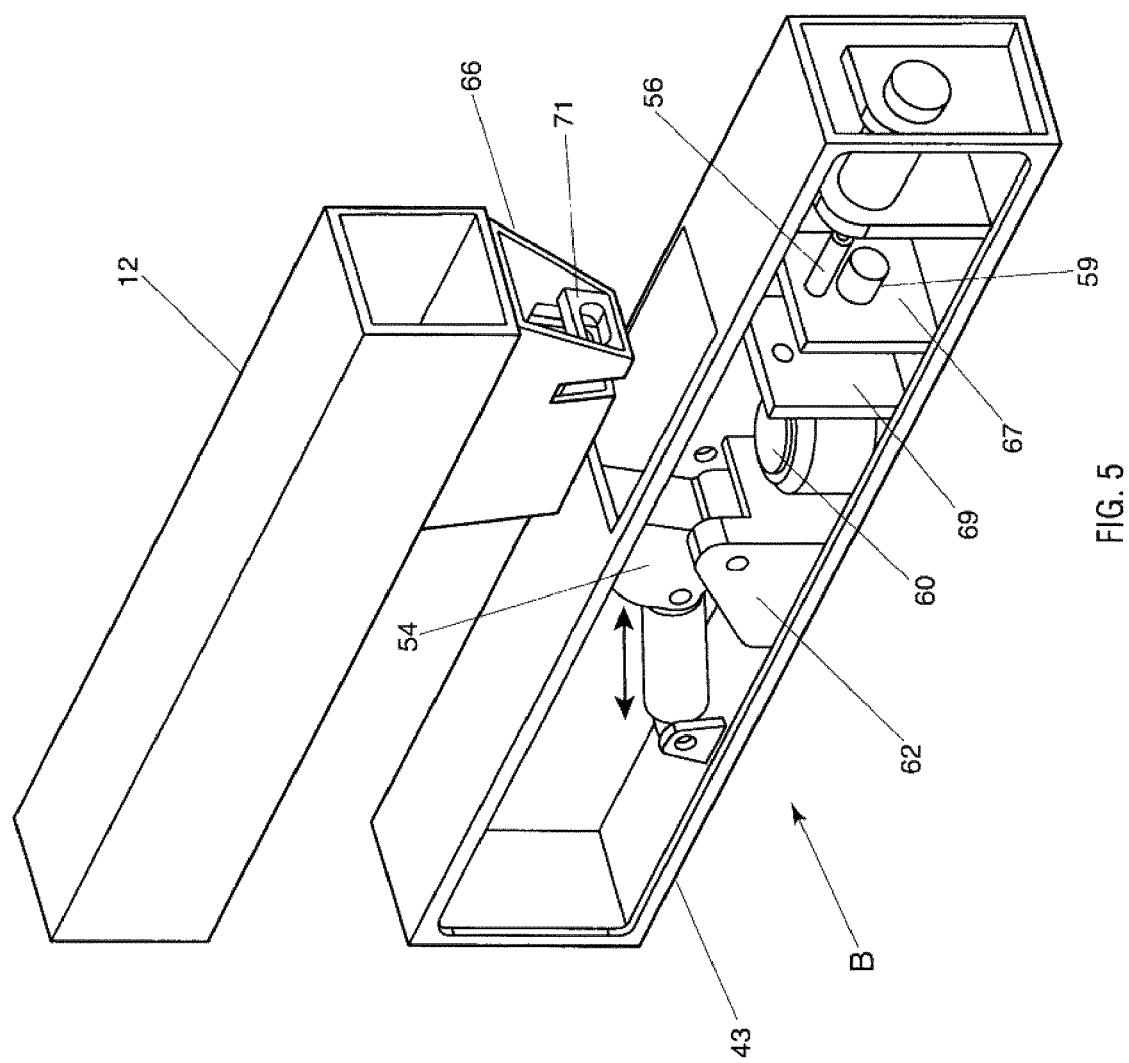
FIG. 5 is a perspective view of locking system.
Figure 6:
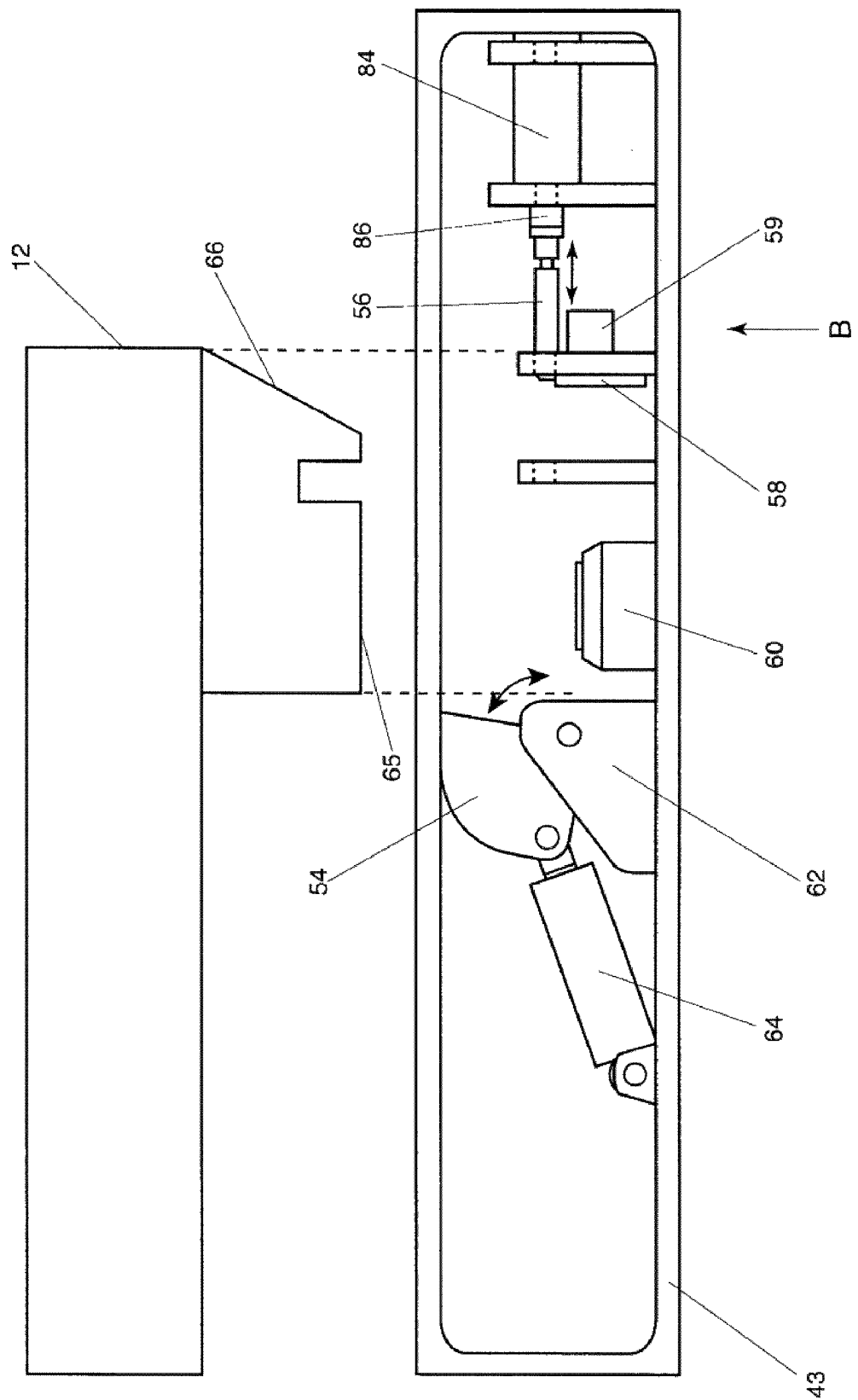
FIG. 6 is a side view of the locking system in an unlocked configuration.
Figure 7:
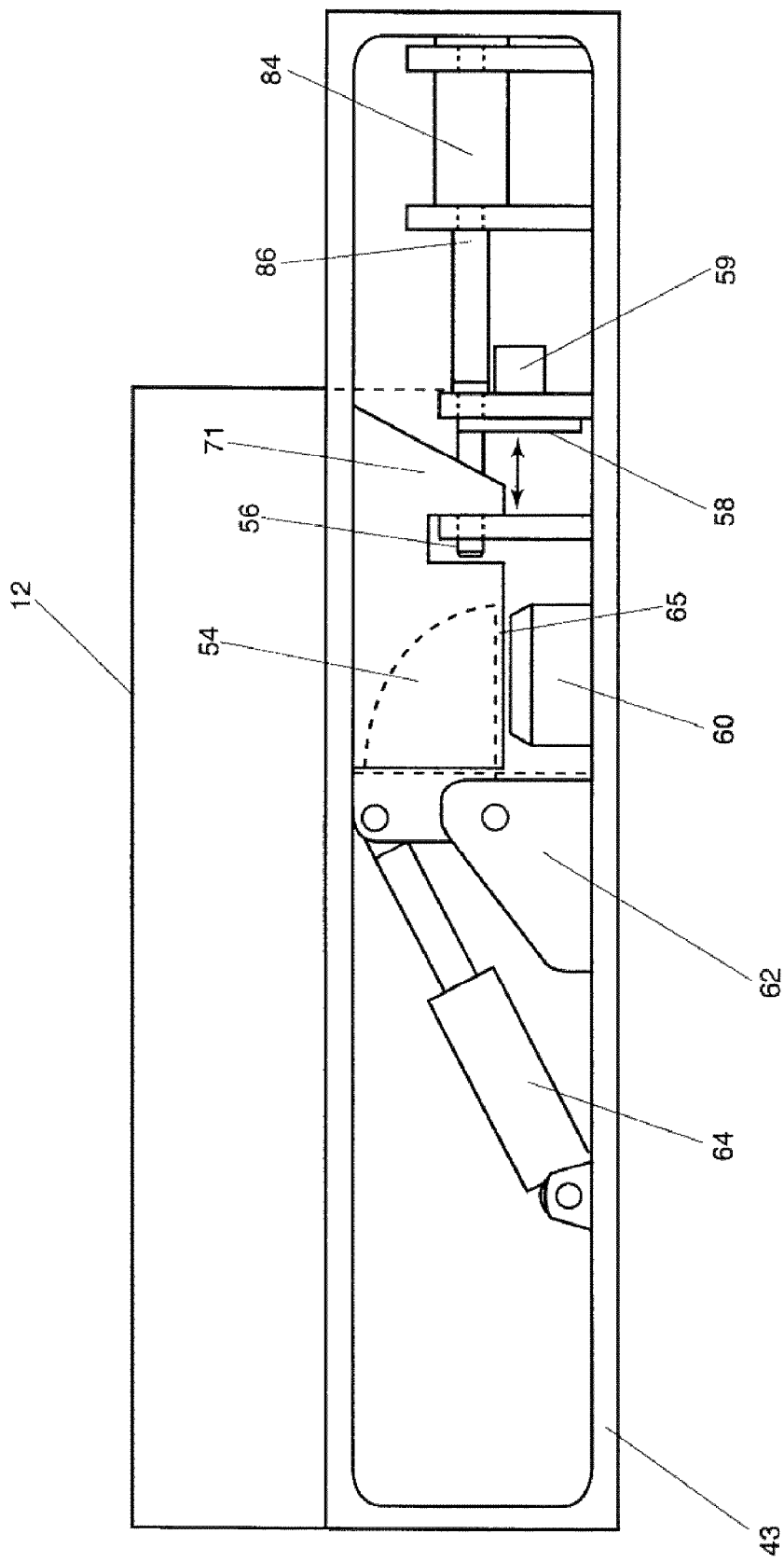
FIG. 7 is a side view of locking system in a locked configuration.
Figure 8:
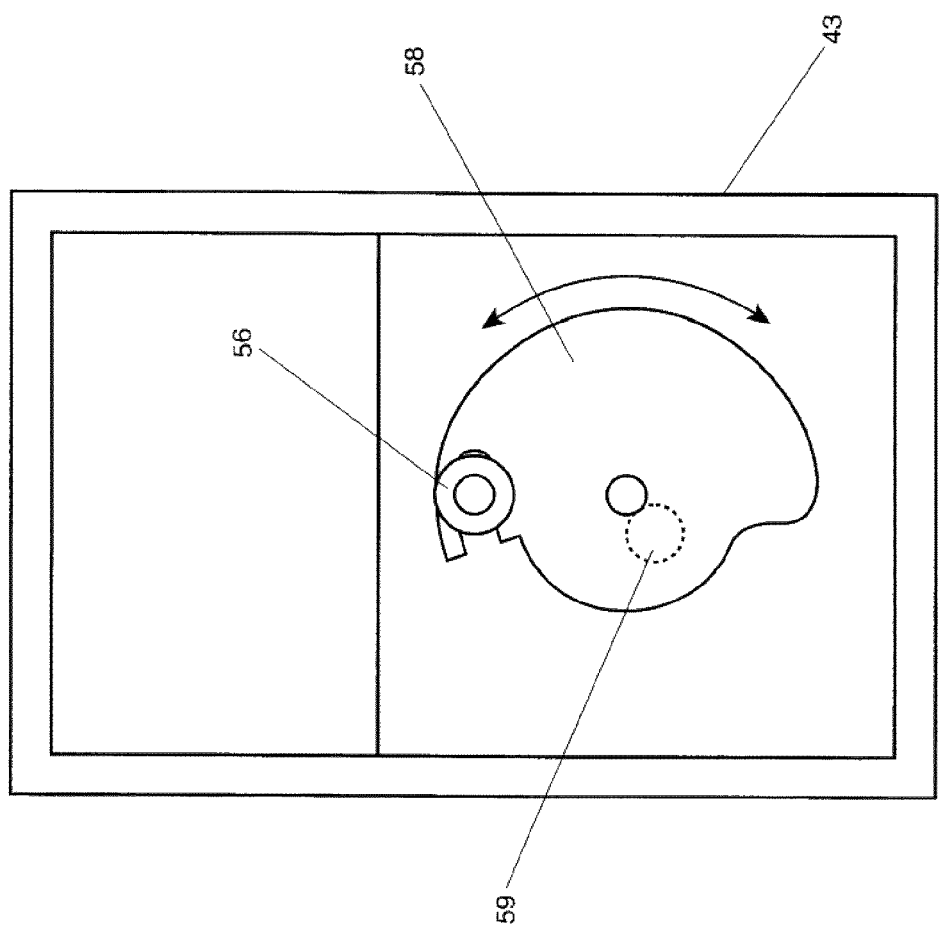
FIG. 8 is a front view of the rotational clip.

FIGS. 5, 6, and 7 show the preferred lock configuration which is an exploded view of B of FIG. 4. FIG. 5 is a perspective view of locking system B, FIG. 6 is a side view of B in an unlocked configuration, FIG. 7 is a side view of locking system B in a locked configuration and FIG. 8 is a front view of the rotational clip. The preferred locking system has a three step of three locking systems, which are engaged sequentially by pressing engage button 74 of control panel 36. The preferred locking system B consists of a locking arm 54, a locking pin 56, rotating clip 58, load cell 60, locking arm bracket 62, and pneumatic/hydraulic ram 64. Locking arm 54 is attached to locking arm bracket 62 and is driven forward and backwards by pneumatic/hydraulic ram 64, which is preferably a powered ram. The forward and backward movement of pneumatic/hydraulic ram 64 rotates locking arm 54 from an unlocked position, FIG. 6 to a locked position, FIG. 7. Locking arm 54 is lowered to engage bottom plate 65 of locking receiver 66. This is the first locking mechanism. The second system is a locking pin 56 that is inserted between a first locking pin receiver or a first locking pin bracket 67, a locking pin plate 71 and a second locking pin receiver or a second locking pin bracket 69, via a pneumatic cylinder 84 and pneumatic ram 86. This second lock secures locking receiver 66 to frame 43. The third locking mechanism is a rotating clip 58 that engages locking pin 56 as shown in FIG. 8. The rotational movement for rotating clip 58 is provided by servo motor 59

To disengage, as shown in FIG. 6, rotating clip 58 is rotated, releasing locking pin 56, locking pin is withdrawn from first locking pin bracket 69, a locking pin plate 71 and a second locking pin bracket 67. Pneumatic/hydraulic ram 64 is driven backwards, pulling locking arm 54 away from bottom plate 65 of locking receiver 66, which allows for removal of locking receivers 66. This process is performed in reverse of the locking process and is activated by pressing disengage button 76 of control panel 36.

As shown in FIGS. 5, 6, and 7, the system also has load cells 60 affixed to RDMC 10 to accept bottom plate 65 to assist in locating and sensing the correct mounting of RDM 12. This configuration also provides a sensor to verify alignment for the engagement.

Figure 9:
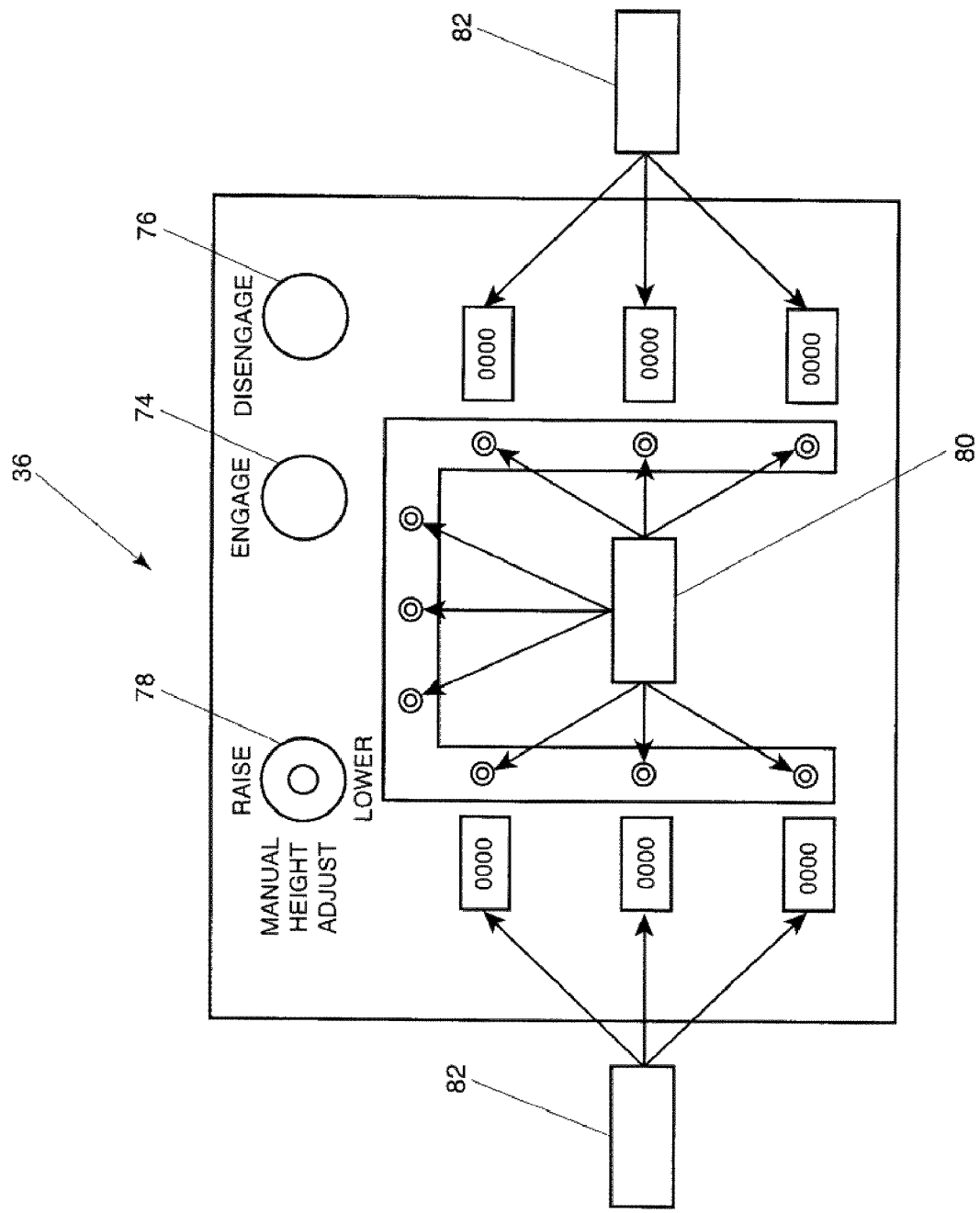
FIG. 9 shows the control panel.

FIG. 9 is a view of the RDMC control panel 36. Control panel 36 is preferably mounted in the center of the vehicle dash inside the RDMC cab for easy access by the user. Control panel 36 controls the automated engagement and disengagement of the RDM modules 12 with an onboard computer. Control panel 36 can be mounted on a hinged panel that will allow the panel to be raised and a compartment underneath can house full manual override controls of the RDMC and the RDM engagement and disengagement process. Control panel 36 has buttons for automatic engagement 74 and disengagement 76 of locking system 50, height adjustment switch 78 to raise and lower RDMC via pneumatic suspension components 28, and light emitting diode (LED) indicators 80, or the like for lock and RDM engagement status for each lock 50. Additionally, control panel 36 can have load cell readouts 82, showing the load from each of load cells 60. Again, six load cells are shown in this example; however this disclosure is not limited to this number.

The demounting procedure for RDM 12 from RDMC 10 is as follows. Referring to FIGS. 2-8, RDM 12 is raised to a specified height by RDMC 10. RDMC platform is raised via pneumatic suspension components 28. During start of the sequence, height adjust 78 of control panel 36 is set to raise, causing cylinders in the pneumatic suspension components 28 to be pressurized for extension raising of RDMC platform 10 to maximum height allowing clearance for RDM stands 24 to be dropped into position. Control system 36 activates height adjust 78 to lower RDMC platform 10 via pneumatic suspension components 28 by bypassing pressure to compression side of cylinder lowering RDM platform 10. The RDMC's suspension will continue until one of the RDM legs 24 contact sensors 25 comes into contact with a surface or trips. Pneumatic suspension 28 will stop retracting and the un-tripped ROM stands legs 24 will begin to extend until each of the contact sensors 25 or contact switches are tripped. The lowering operation ceases when all RDM stand proximity sensors 25 confirm contact. When all contact switches 25 are tripped, locking system 50 is ready to disengage. Disengage button 76 of control panel 36 is pressed causing RDM locks 50 to disengage. RDMC is then lowered via height adjust switch 78 of control panel 36, via pneumatic suspension 28 to a desired height to allow sufficient clearance of RDMC platform 10 from RDM 12. RDMC 10 is then driven away from suspended RDM 12.

The mounting procedure for mounting RDM 12 onto RDMC 10 is as follows. Referring to FIGS. 2-8, RDMC 10 is lowered by engaging the height adjust switch to lower RDMC platform 10, via pneumatic suspension 28. RDMC 10 is then positioned with the platform under a suspended RDM 12. RDMC 10 Engagement button 74 of control panel 36 is pressed, causing pneumatic suspension 28 to extend, raising RDMC platform 10. When all load cells 60 show proper values, the locking procedure begins. Pneumatic/hydraulic ram 64 starts to extend and engages bottom plate 65. The three locking mechanisms are engaged as described above, and all load cell indicators show an engaged status 80 on control panel 36, the RDMC is in a "fully locked" status. RDMC 10 with mounted RDM 12 is ready for use.

Although the claimed invention has been described in detail with particular reference to these preferred embodiments, other embodiments can achieve the same results. Variations and modifications of the presently claimed invention will be obvious to those skilled in the art and it is intended to cover in all such modifications and equivalents. The entire disclosures of all references, applications, patents, and publications cited above, are hereby incorporated by reference.

What is claimed is:

1. A locking system for locking a removable platform onto a vehicle comprising:
    at least one first locking mechanism comprising a moveable locking arm disposed on a frame of the vehicle and further comprising a locking receiver disposed on the platform, an engagement bottom plate disposed on the locking receiver and a ram for moving the locking arm onto said engagement bottom plate;
    at least one second locking mechanism comprising a moveable locking pin disposed on said frame and at least one locking pin plate disposed on said locking receiver and a means for pushing said locking pin into the at least one locking pin plate; and at least one third locking mechanism comprising a rotating clip disposed on said frame for engaging an end of the locking pin.

2. The locking system of claim 1 further comprising at least one automatic actuator for sequentially activating and deactivating the at least one first, at least one second, and the at least one third locking mechanisms.

3. The locking system of claim 1 further comprising at least one load cell disposed on the frame to locate and sense a proper mounting of the platform on the vehicle.

4. The locking system of claim 1 further comprising a control panel for controlling an engagement and disengagement of the locking mechanisms.

5. A method for locking a removable platform onto a vehicle, the method comprising the steps of:

disposing the platform onto the vehicle;

actuating at least one first locking apparatus, comprising rotating a locking arm affixed to the vehicle onto a locking receiver affixed to the removable platform;

actuating at least one second locking apparatus, comprising inserting a locking pin affixed to the vehicle into at least one locking pin plate affixed to the removable platform; and actuating at least one third locking apparatus comprising engaging a rotating clip affixed to the vehicle over an end of the locking pin.

6. The method of claim 5 further comprising the step of sequentially activating and deactivating the at least one first, at least one second, and at least one third locking apparatus.

7. The method of claim 5 further comprising the step of sensing and locating the platform on the vehicle with at least one load cell.

8. The method of claim 5 further comprising the step of controlling the actuation and deactivation of the locking apparatuses with a control panel.

* * * * *

UNITED STATES PATENT AND TRADEMARK OFFICE
CERTIFICATE OF CORRECTION

| | | |
|---|---|---|
| PATENT NO. | : 7,984,941 B2 | Page 1 of 1 |
| APPLICATION NO. | : 12/433001 | |
| DATED | : July 26, 2011 | |
| INVENTOR(S) | : Montana Trey Lorenzo and Henry Tyrell Lorenzo | |

It is certified that error appears in the above-identified patent and that said Letters Patent is hereby corrected as shown below:

Title page, item [76] The last name of the second named inventor "Henry Tyrell Lorezno" should be changed to --Henry Tyrell Lorenzo--.

Signed and Sealed this

Thirteenth Day of September, 2011

David J. Kappos
*Director of the United States Patent and Trademark Office*